United States Patent [19]

Walker, Jr.

[11] Patent Number: 4,589,615

[45] Date of Patent: May 20, 1986

[54] STORE LOAD AND EJECTOR DEVICE FOR AIRCRAFT

[75] Inventor: Ralph M. Walker, Jr., Fort Worth, Tex.

[73] Assignee: General Dynamics Corporation, Fort Worth, Tex.

[21] Appl. No.: 402,464

[22] Filed: Jul. 28, 1982

[51] Int. Cl.$^4$ ............................................. B64D 1/02
[52] U.S. Cl. ............................. 244/137 R; 244/118.1; 89/1.59
[58] Field of Search ............. 244/137 R, 118.1, 118.2, 244/2, 130, 54, 100 R; 89/1.5 R, 1.5 B, 1.5 C, 1.5 F, 1.5 G, 1.5 H, 1.815

[56] References Cited

U.S. PATENT DOCUMENTS

| | | | |
|---|---|---|---|
| 1,419,419 | 6/1922 | Snow | 244/100 R |
| 3,122,056 | 2/1964 | Fitch et al. | 244/137 A |
| 3,624,833 | 11/1971 | Ricard | 244/137 A |
| 3,771,416 | 11/1973 | Ackerman, Jr. et al. | 244/137 A |

FOREIGN PATENT DOCUMENTS

| | | | |
|---|---|---|---|
| 2543479 | 4/1977 | Fed. Rep. of Germany | 244/118.2 |
| 1212985 | 3/1960 | France | 244/137 A |
| 2070209 | 9/1981 | United Kingdom | 244/137 A |
| 2077678 | 12/1981 | United Kingdom | 244/137 A |

*Primary Examiner*—Galen L. Barefoot
*Attorney, Agent, or Firm*—Charles E. Schurman; James C. Fails

[57] ABSTRACT

A store load and ejector device for carrying stores on the exterior of an aircraft or the like and for dispensing same at the option of a pilot comprising a cap plate for connecting with the aircraft, struts connected with the cap plate and carrying at their bottom ends support beams having ejector racks capable of selectively dispensing the stores and at least two cross braces connected to and between respective support beams forward and aft of the struts so as to maintain separation of the support beams and any stores thereon. The cross members and the struts have biconvex shape with leading and trailing edges sweeping at respective angles within the range of 20°–50° so as to present low radar reflection or radar cross section. The struts, support beams and cross braces have biconvex shape for reduced drag.

23 Claims, 6 Drawing Figures

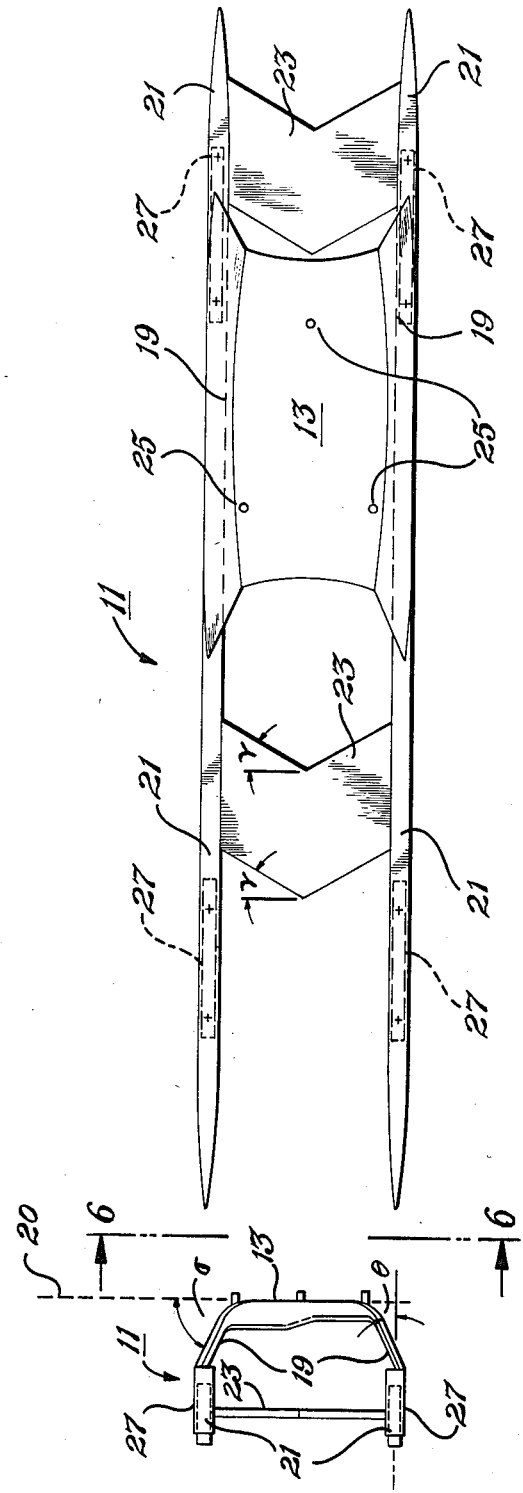

STORE LOAD AND EJECTOR DEVICE FOR AIRCRAFT

SPECIFICATION

FIELD OF THE INVENTION

This invention relates to accessories for aircraft. More particularly, it relates to externally attachable apparatus for carrying and dispensing, selectively, stores; such as, bombs, air-to-air and air-to-ground missiles, auxiliary fuel tanks and other special purpose loads such as electromagnetic/optical equipment pods.

BACKGROUND OF THE INVENTION

The prior art has seen a wide variety of aerial armament and weaponry ranging from the early World War I planes in which the pilots simply dropped bricks, or tossed grenades, or else fired their side fire arms at opposing pilots to the bombers employing bomb bays and other internal store load and ejector devices. One of the developments has been the use of smaller, less costly fighter-bomber, or fighter type aircraft to perform limited missions and then employ external store loading and ejector devices for extending the range of missions on which the planes could be used. These have included struts, pylons and, most recently, T-shaped store load and ejector devices. These latter T-shaped struts, or pylons, had a fairly large base that affixed to the load bearing points, called hard points, on the aircraft. For example, they might be connected to a wing hard point with bolts or the like. Extending downwardly from the T-shaped base would be a strut, or pylon that has a prism shaped accessory or ejector rack at its lower extremity for attachment thereto and dispensing therefrom of a plurality of stores, e.g., bombs. To carry a plurality of stores the racks typically include a clutter of attachment means or members extending inefficiently out into the airstream from the pylon for bracing and arming the stores. These include bracing arms and bolts, extension plates, arming cables, etc. which undesirably cause high, permanent aerodynamic drag. This also has disadvantages of being heavy and presenting a large radar profile, or cross-section, so that it was easily visible to radar. Also, certain prior art devices have necessitated a partially sidewise ejection path as the store is being released and have not permitted fully selective release of the stores carried. For example, for some combinations of stores carried, certain of the stores had to be ejected before others which in event of malfunction may require ejection and thus loss of the ejector rack itself. It is desirable that an effecient externally carried store load and ejector device have the following features not heretofore provided.

1. The store load and ejector device should be relatively lightweight, viz., lighter in weight relative to stores it is able to carry than those heretofore available.
2. It should have lower permanent drag on the aircraft so as not to interfere with performance or significantly reduce the speed, maneuverability or range of the aircraft.
3. It should have a low radar cross section, or radar profile, so as to prevent being easily tracked by radar.
4. It should have the flexibility of carrying a few large bombs or several smaller bombs, not limited to two or three small bombs as in the prior art and full selectivity in stores release so that any of the stores can be released (dispensed) while retaining any other at the pilot's option.

From the foregoing, it can be seen that the prior art has failed to provide such combined features.

SUMMARY OF THE INVENTION

Accordingly, it is an object of this invention to provide a store loading and ejector device that can be affixed to the aircraft to carry a plurality of stores and enables fully selective release thereof and that has one or more of the features delineated hereinbefore and not heretofore provided by the prior art.

It is a specific object of this invention to provide a store loading and ejector device that has all of the advantages of the preceding object and all of the desirable features delineated hereinbefore and not heretofore provided.

These and other objects will become apparent from the descriptive matter hereinafter, particularly when taken in conjunction with the appended drawings and claims.

In accordance with this invention there is provided a "clean" or uncluttered store load and ejector device for carrying stores on the exterior of an aircraft and for dispensing or retaining any of the stores at the option of the pilot, comprising:

a. a cap plate having a plurality of fastening points for connecting to load bearing points of the aircraft and providing both lateral and longitudinal structural stability and having a longitudinal axis;

b. at least two struts connected to the cap plate and downwardly depending therefrom in operational configuration, the struts having biconvex shape with their leading edges inclined at a sweep angle a (alpha), bottom to top, within the range of 20°–50° with respect to the cap plate so as to present a small radar cross section by reflecting incident electromagnetic wave (e.g., radar microwave) energy at an angle away from the transmitter-receiver rather than back toward the radar receiver, and to minimize induced aerodynamic drag;

c. at least two support beams connected respectively to respective said struts; each said support beam being long enough to carry optionally at least one elongate store and a plurality of less elongate stores with nose-tail fin spacing, for separation; each of the support beams carrying one or more ejector racks capable of selectively dispensing the stores; each of the support beams having a nose and tail fairing each having a fineness ratio in the range of 2–3, inclusive; and d. cross brace means connected to and between respective support beams forward and aft, respectively, of the struts and the respective longitudinal centers of the beams so as to maintain separation of the support beams and any stores thereon and to react tension and compression loads. The cross braces are of biconvex shape with leading edges sweeping rearwardly e.g., from a center point at respective angles $\gamma$ (gamma) within the range of 20°–50° with respect to the longitudinal axis of the cap plate to provide minimized drag and to present only a small radar cross section as with the struts.

The struts are designed to have trailing edges having an aft sweep angle $\beta$ (beta), top to bottom, within the range of 20°–50° so as to present a low radar profile. The cross brace means also have trailing edges having a sweep angle within the range of 20°–50° and being parallel with the leading edges thereof. The struts are spaced to have at least one store diameter (preferably, two store diameters) space between the closest adjacent stores on the respective struts or support beams connected therewith.

BRIEF DESCRIPTION OF THE DRAWINGS

FIG. 5 is a top plan view of the device of FIGS. 1–4 taken along line 5—5; and

FIG. 6 is a front end elevational view taken along line 6—6.

DESCRIPTION OF PREFERRED EMBODIMENTS

Figure 1:
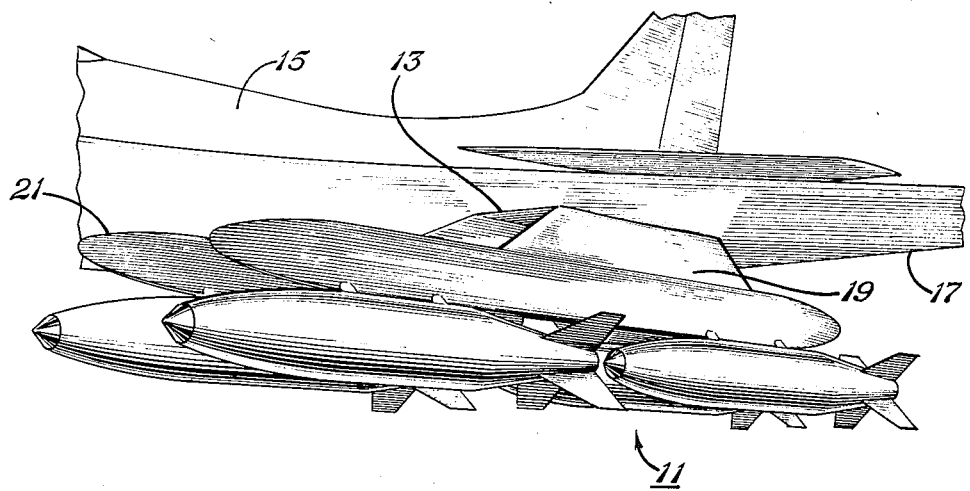
FIG. 1 is a partial perspective view of one embodiment of a store load and ejected device of this invention underslung beneath a wing of a fighter bomber aircraft with four bomb type stores attached, two stores (in tandem) to each support beam.
Figure 2:
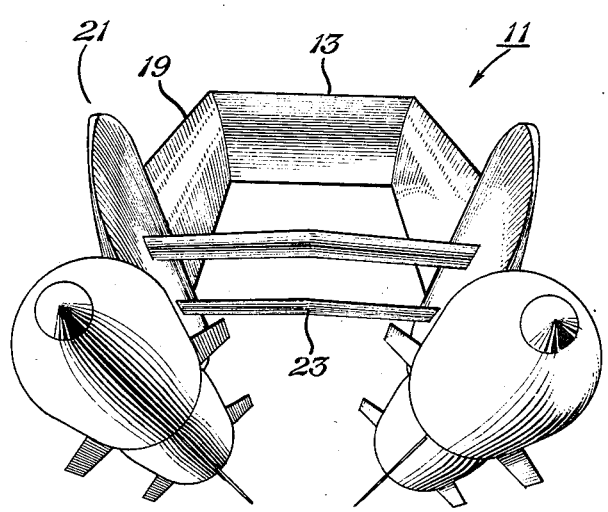
FIG. 2 is a front perspective view of the device of FIG. 1 not installed on the aircraft but having stores of FIG. 1 attached.
Figure 3:
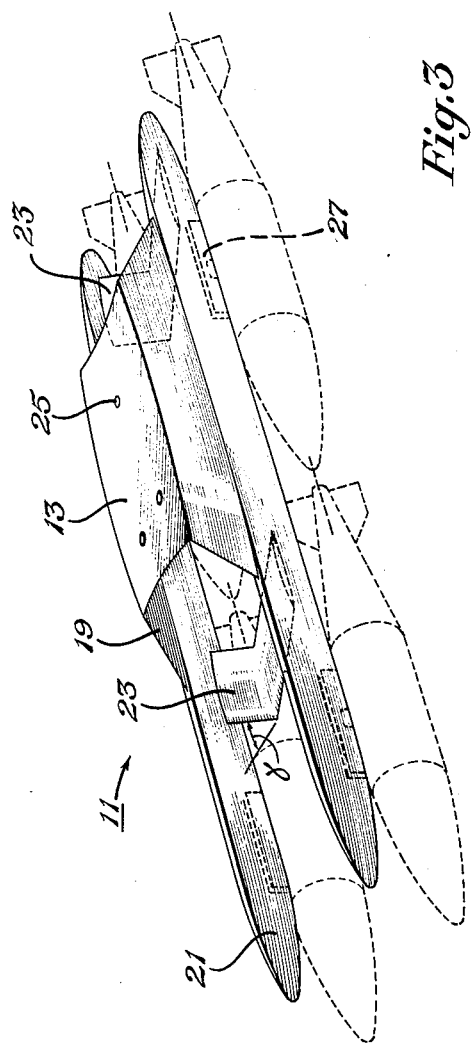
FIG. 3 is an isometric view of the device of FIG. 1 showing the stores in phantom lines.
Figure 4:
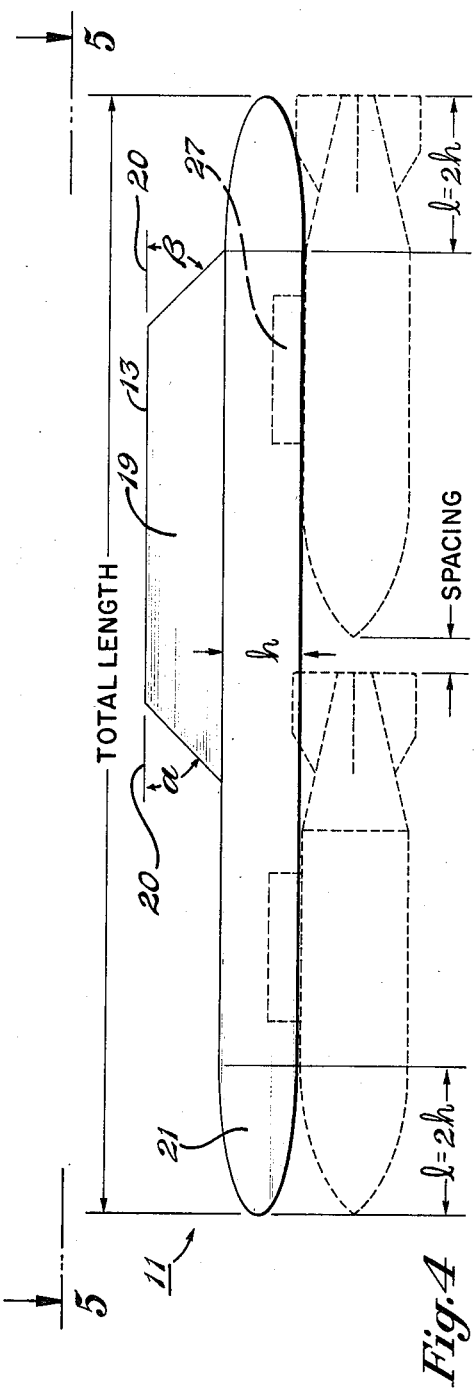
FIG. 4 is a side elevational view of the device of FIG. 3.

Referring to FIGS. 1-6, the store load and the ejector device 11 has a cap plate 13 for connecting with a portion of the airplane 15; for example, the wing 17. In addition, the store load and ejector device has at least two struts 19 depending downwardly from the cap plate 13 and carrying, respectively, at least two support beams 21 that are separated by at least two cross braces 23, FIGS. 2 and 3.

The cap plate 13 is the principal structural member of the device and it is the portion by which the device is attached to the aircraft. Through it, all loads are transmitted to and from the aircraft. As illustrated, the cap plate is approximately rectangular in plan form but with curved edges and has provisions for three attachment fittings which react loads along, and moments about, all three aircraft axes. Specifically, the cap plate 13 is formed of suitable structural material such as aluminum or steel. As illustrated there are three apertures 25 for affixing by attachment fittings (not shown) to "hard points" on the aircraft as will be understood. These hard points may be located, for example in or on structural members of the wings, or the fuselage, that are designed specifically for affixing of external loads. Ordinarily, attachment fittings in the form of counter sunk bolts are screwed through the apertures from the bottom and into the structural part of the aircraft, although other arrangements may be employed. In any event, the cap plate 13 provides adequate structural support for the respective right and left struts 19.

Struts 19 are connected to and depend from the cap plate 13, as by being integrally formed therewith through either welding or other such techniques. An understanding of functional advantages of particular embodiments of the struts in terms of configuration, can be gained through trade studies involving structural strength, weight, aerodynamic drag, radar cross section, and compatibility with physical constraints. In the disclosed embodiment the sweep of the leading and trailing edges and the inward, upward cant of these members (from the vertical) (a.) reduces the monostatic scattering of incident electro-magnetic (including RF) energy and thus suppress the radar cross section (RCS), (b.) minimizes the mutual aerodynamic interference of components and delay drag rise at transonic speeds, and (c.) provides efficient load paths from the cap plate to the support beams. Ordinarily, the struts will be made of the same material as the cap plate. For example, the struts may be formed of aluminum, magnesium or other high strength alloy.

It also is theoretically possible to form the struts of composite materials such as the graphite fiber and epoxy resin composites. The struts 19 are biconvex in physical cross sectional shape with their local thickness-to-chord ratio selected to provide an efficient structure with adequate strength and rigidity (and to handle the loads and moments introduced by the stores on the support beams), and to minimize the wave drag in supersonic flow. Specifically, the struts are inclined at their forward edges at an upward and rearward sweep angle alpha of 45 degrees which gives excellent results and is within the advantageous range of 20°–50°, with respect to the cap plate reference plane 20 (see FIG. 4) so as to provide a small radar cross section in the forward sector. The struts 19 have their trailing edges angled downward and rearward from the cap plate reference plane 20 at a sweep angle beta ($\beta$) at 45 degrees which has been found highly effective and falls within the beneficial range of 20°–50° with respect to the cap plate reference plane.

The dimensions accord with two important concepts. Firstly, they are sized to maintain at least one store diameter between closest adjacent stores on respective struts or between a store and the wing or other part of the aircraft. This measure minimizes aerodynamic interference and insures a clean separation. Secondly, the dimensions are sized to maintain adequate physical clearance with the aircraft and with the ground. For example, adequate space must be provided for full extension of flaps and control surfaces, for installation and servicing, and for ground clearance on takeoff and landing. Thus, the dimensions themselves may vary depending upon the location on the aircraft and on the particular aircraft on which the store load and ejector device is to be employed.

As illustrated, the struts have a substantially trapezoid side plan (or elevational) configuration and extend downward angled laterally outward from the cap plate and have adequate structural strength to support the load on the respective support beams 21. The struts, from their outer side surfaces to the plane of the cap plate each make an angle sigma ($\sigma$) of 65 degrees which gives excellent results in weight, material saving and lower RCS of the device. In some cases good results are obtained when sigma is within a range of from about 60 degrees to about 80 degrees of angle.

Each of the dual support beams or runners 21 are positioned vertically in the height direction with respect to (normal to) the cap plate reference plane 20 and are connected respectively at their top edges to lower edges of the respective dual support struts 19. The beams are seen to lie generally laterally outward of the connection of the struts to the cap plate with the vertical center planes through the height of the struts forming an angle theta ($\theta$) with the strut of 25 degrees, viz., equal to the complement of sigma. In some cases, angle $\theta$ advantageously will lie in the range of about 10 to about 30 degrees. Each support beam is long enough to carry at least one elongate store, or a plurality of less elongate stores with adequate nose-tail separation. Each of the support beams 21 carries a forward and rearward store ejector or ejector rack of known construction which are capable when actuated of selectively dispensing the stores responsive to the pilot's instruction to the stores management system in the aircraft.

The cross section of the support beam is a result of trade studies aimed at the development of a configuration having the lowest frontal area consistent with substantially fully enclosing the ejector (except their lower, stores attaching portions) and providing sufficient strength and bending stiffness to accomodate all in-flight, ground, maneuver, and ejection loads. A height to length ratio for the beams in the area of about 1:18 has been found in practice to produce good results. The physical width and depth of the beam meeting these requirements, however, depends on the materials used and the type of construction employed. In the embodiment shown, a low frontal area contributes to low radar profile as well as low profile drag.

The materials and construction that are employed in the support beams may be metallics or composites used in accord with known fabrication techniques. For example, the beams may be of I-beam internal construction having a smooth outer skin or surface of composite material. In order to have adequate structural rigidity yet have a low profile, it is preferred that the length l of the nose and tail fairings be related to the height by a ratio referred to as the fineness ratio. Preferably the fineness ratio is defined as the length l divided by the height h and is in the range of 2-3, inclusive (see FIG. 4). This means that the length of the nose and tail fairings is at least about twice the height of the support beam 21 but no more than about three times the height. Where it is less than about twice the height, the support beams are too blunt and create excessive drag. Where it is more than about three times the height there is excessive length.

The support beams 21 are biconvex in cross section. This means that they are symmetrical fore and aft as well as top and bottom.

To add stability to the whole structure, (particularly under asymmetric loading conditions), the cross braces 23 are provided fore and aft of the struts and fore and aft of the center line of the respective support beams to tie the beams together and yet maintain adequate separation. In appearance, these cross braces resemble miniature swept back wings of constant chord and having a biconvex airfoil section. This configuration, together with its fore and aft placement on the support beams delays the onset and reduces the severity of drag rise at transonic speeds; and suppresses the radar cross section in the nose region. The latter results from the obliquity or sweep back of the free edges of the cross braces 23, which causes any incident radio frequency energy to be back scattered in a direction away from its source. Specifically, as illustrated, the cross braces have their leading edges and their parallel trailing edges swept back or skewed rearwardly from the respective center points of the braces at respective sweep angles gamma ($\gamma$) 30 degrees which provides excellent RCS reduction. This angle is within the beneficial range of 20°-50° with respect to the longitudinal axis of the cap plate so as to minimize the forward hemisphere radar cross section (RCS) (see FIG. 5).

The structural member cross braces 23, similarly as with the support beams 21, are made of suitably strong material having light weight. Typical of such materials are the aluminum and magnesium alloys, or the plastics with structural fibers (composites) discussed with respect to the support beams 21.

In operation, the store load and ejector device is physically connected with the aircraft; for example, to the referred-to "hard points" on the wing underside by bolts through the three apertures 25. The electrical interconnection of the respective ejector racks 27, wiring for which is wholly within structural members (beams, struts, cap plate) of the device. The necessary electrical wiring (harness) passes through the cap plate via a port or ports to connection (not shown) in the wing. The connection is thus made with the respective arming and dropping switches at the control panel (not shown) of the aircraft 15 are made. A number of racks can be employed. For example, Texas Instruments' BRU-102 can be employed. These ejector racks are designed to enable releasing, simultaneously or selectively, the respective stores responsive to movement of an electrical switch at the control panel; and are well known in the art and need not be described herein in detail. Thereafter, the stores are attached to the ejector of the device by appropriate personnel. The pilot then taxis the aircraft, takes off and flies to the release point or points; at which points the respective stores are released from the respective ejector racks. The store load and ejection device remains affixed to the aircraft for the return mission.

It will be seen that the present device, in providing a clean, smooth exterior, the structural members substantially free of the "clutter" of other bracing and arming members protruding into the airstream, reduces aerodynamic drag on the aircraft thus avoiding their adverse effect on range, pay load, altitude, speed or other performance capability of prior structures. All support struts and cross braces have a 5-6% thickness to chord (t/c) ratio of their biconvex sections. Four "fourteen inch" ejectors are employed. It will be evident that the support beams are cleanly faired fore and aft with the ejectors substantially fully recessed up into the beams so as to be substantially wholly contained on all sides therein except for the lower (stores attaching) face. The construction provides adequate clearance for both the leading edge and the trailing edge of the wing, including flap and control surface clearances. Four large bomb type stores can be attached, two each in tandem to the store loading and ejector device and individually (selectively) released or released all at once as desired. All stores are vertically releasable without interference from other stores carried which provides greater assurance of weapon release and accuracy of delivery on target.

Wind tunnel tests of the store loading and ejector device installed on an existing fighter aircraft showed that the device contributed only about 40% of the drag typically associated with currently available external carriage devices. With eight bombs installed on two store loading and ejector devices, e.g., one device under each wing, the drag contribution with stores attached was one third less than prior devices. Otherwise stated, the device reduces drag due to the stores carriage device used by about half. As a result, the device of this invention enables a 30% increase in mission range of the fighter airplane, in addition to a thirty knot higher penetration speed at military power.

The store load and ejector device of this invention not only provides high structural and aerodynamic efficiency, but also provides high survivability in combat due to the reduction in the radar signature. Measurements made on a radar test range showed a store load and ejector device of this invention to have about one-tenth of the radar signature (cross section) of a typical conventional stores carriage device from a nose-on sector.

A particularly desirable device of this invention has approximately 4 inch wide support beams having overall length of 185 inches, a width between vertical longitudinal centerlines of 25 inches and a total height of 20 inches from the bottom of the runners (beams) to top of the cap plate, the struts and beams being of equal (10 inch) height. With a cap plate approximately 52 inches long the cap plate (and the upper edge of the struts) are each about one-third or less the length of the runners, which are about 3.5 times the length of the cap plate. The cap plate has an average width approximately one-half the average length, side edges being convex and fore and aft edges concave. The runners are approximately 2.5 times the average length of the struts or a strut average length about two-fifths the length of a runner. Each cross brace has a chord equal to about one-tenth the length of a support beam or the device overall so that the total length of the cross braces is about one fifth the length of the device overall. In some embodiments total length of the cross brace means may range from about 5 to about 25 percent of the length of the device.

The depicted device reveals a weapon stores carriage and dispensing device having a (snow or ice) sled-like configuration of an upper support portion or means (horizontal cap plate and struts) attached above, and generally between and rearward of the fore and aft center of, a lower support portion or means formed by a pair of long "runners" (support beams) extending forward and rearward therefrom. The structure thus has a generally central support portion of inverted U-shape cross section the legs of which diverge down and outward to join lower extensions (support beams) which extend vertically down and parallel, the lower extensions extending well forward and also rearward beyond the central support portion where they are connected by horizontal cross braces.

It also can be seen that each strut (19) and its associated beam (21) together form a depending store load support member, one at each side of the cap plate and each lying in substantial part laterally outward of the cap plate. Each such member has its upper portion (strut 19) integrally joined with its lower portion (beam 21), the upper portion being substantially shorter than the lower portion and angled laterally (angles $\sigma$ and $\theta$) downward and outward with the lower portion depending vertically from the upper portion to form an angle therewith.

One of the advantages of this invention is that the highly efficient, aerodynamically superior store load and ejector device combines the current functions of separate pylon and ejector racks into a single, multifunctional unit.

Moreover, the store load and ejection device of this invention satisfies the objectives delineated hereinbefore and not heretofore provided by the prior art. It also permits vertical installation and ejection of stores. This feature reduces the labor of mating and securing of stores as compared with conventional, non-vertical, carriage arrangement. Vertical ejection also improves weapon delivery accuracy by minimizing lateral ("cross-track") dispersions of the released weapons.

In addition, the stores loading and ejector device of this invention provides for generous lateral spacing apart of the stores from each other and from the aircraft to minimize mutual physical and aerodynamic interference; and contributes to clean store separation and low interference drag. Additionally, the store load and ejection device of this invention provides significantly lower aerodynamic drag both with and without stores attached than is experienced with current carriage methods.

Although the invention has been described with a certain degree of particularity, it is understood that the present disclosure is made only by way of example and that numerous changes in the details of construction and the combination and arrangement of parts may be resorted to without departing from the spirit and the scope of the invention, a reference for the latter being had to the appended claims.

What is claimed is:

1. A store load and ejector device for carrying stores on the exterior of an aircraft and for dispensing same at option of a pilot, comprising:
   a. a cap plate having a plurality of at least three fastening points for connecting to load bearing points of the aircraft and having an appropriate center for the accumulation of forces and moments; said at least three fastening points providing stability about the respective pitch, roll and yaw axes;
   b. at least two struts connected to said cap plate and downwardly depending therefrom in operational configuration; said struts having biconvex shapes with their leading edges inclined at a sweep angle alpha, bottom to top, within the range of 20°–50° with respect to said cap plate so as to present a small radar cross section and low wave drag;
   c. at least two support beams connected respectively to respective said struts; each said support beam being long enough to carry one or more elongate stores; each said support beam carrying a plurality of ejector racks capable of selectively dispensing said stores; each said support beam having a fineness ratio in the range of 2–3, inclusive, for nose and tail;
   d. at least two cross braces connected to and between respective support beams forward and aft, respectively, of said struts so as to maintain separation of said support beams and any stores thereon; said cross brace having bi-convex shapes with their leading edges sweeping rearwardly from a center point at respective angles within the range of 20°–50° with respect to said longitudinal axis of said cap plate so as to present a small frontal radar cross section.

2. The store load and ejector device of claim 1 wherein said cap plate has three fastening points for fastening to three load bearing points on the aircraft.

3. The store load and ejector device of claim 1 wherein said struts are integral with said cap plate.

4. The store load and ejector device of claim 1 wherein said struts have trailing edges with a reverse sweep angle beta, top to bottom, within the range of 20°–50° with respect to the cap plate.

5. The store load and ejector device of claim 1 wherein said struts and support beams are spaced apart sufficiently that at least one store diameter laterally separates the closest respective stores suspended from respective ejector racks.

6. The store load and ejector device of claim 1 wherein the fairings of said support beams have a fineness ratio in the range of 2–3, inclusive.

7. The store load and ejector device of claim 1 wherein said cross braces have sweep angle gamma on their trailing edges within the range of 20°–50°, also; such that the trailing edges are parallel with the leading edges.

8. A unitary store load and ejector device for carrying stores on the exterior of an aircraft and for dispensing stores therefrom comprising:
   a. cap plate for connecting to a load bearing portion of an aircraft;
   b. at least two strut members integrally connected to said cap plate and depending therefrom at opposite sides thereof;
   c. at least two elongated support beams, each integrally connected respectively to the lower edge of one of said strut members and adapted to carry at least one store, each support beam adapted to carry at least one store ejector rack for attaching a store to its support beam and dispensing the store therefrom;
   d. cross brace means integrally connected between said support beams for maintaining separation of said beams and any stores thereon and capable of reacting tension and compression forces thereon from said support beams and any stores thereon; and
   e. leading and trailing edges of said struts and support beams are inclined in the vertical direction; whereby significant reduction of radar cross section is achieved.

9. The device of claim 8 in which the cap plate and strut members together form an upper support means attaching to upper edges of said support beams, the beams extending forwardly and rearwardly of said upper support means and being about 2.5 to 4 times the length thereof.

10. The device of claim 8 in which said cross brace means extend longitudinally not more than between about 5 to about 25 percent of the length of said support beams.

11. The device of claim 8 in which said strut members are
   a. substantially shorter longitudinally than the support beams; and
   b. canted outward and downward from their attachment to said cap plate to form an angle therewith and with their respective support beams.

12. A unitary store load and ejector device for carrying stores on the exterior of an aircraft and for dispensing stores therefrom comprising:
   a. a cap plate for connecting to a load bearing portion of an aircraft;
   b. at least two strut members integrally connected to said cap plate and depending therefrom at opposite sides thereof;
   c. at least two elongated support beams, each integrally connected respectively to one of said strut members and adapted to carry at least one store, each support beam adapted to carry at least one store ejector rack for attaching a store to its support beam and dispensing the store therefrom;
   d. cross brace means integrally connected between said support beams for maintaining separation of said beams and any stores thereon and capable of reacting tension and compression forces thereon from said support beams and any stores thereon; and
   e. said cross brace means being swept back at an angle for reducing the radar signature thereof.

13. An improved store load and ejector device for aircraft comprising:
   a. a substantially horizontal cap plate having plural fastening points providing for stabilizing the device laterally and longitudinally when secured to an aircraft;
   b. a pair of longitudinally extending load supporting memb depending from opposite side margins of the cap plate for supporting a load of stores to be suspended from said device;
   c. said cap plate being substantially shorter longitudinally than said load supporting members;
   d. each said load supporting member lying substantially laterally outward of a respective side margin of said cap plate;
   e. said load supporting members each comprising
      an upper portion forming a strut joined to a side margin of said cap plate and
      a lower portion forming a store-supporting beam connected at its upper edge to the lower edge of said strut and extending forward and rearward of the front and back edges of said strut and said cap plate; and
   f. at least one store ejector rack carried by each of said beams for attachment and release of stores to be carried thereby.

14. The store load and ejector device of claim 13 in which said horizontal cap plate is substantially planar.

15. The store load and ejector device of claim 13 in which at least one of said struts forms substantially a regular trapezoid having a shorter upper edge and a longer lower edge said upper edge positioned approximately midway of said longer lower edge.

16. The store load and ejector device of claim 13 in which the upper portion of said load supporting member is disposed along its length at an angle laterally to the lower portion thereof and to said cap plate.

17. The store load and ejector device of claim 13 in which the length of a strut exceeds the length of the cap plate.

18. The store load and ejector device of claim 13 in which said strut is angled laterally downward and outward from said cap plate and said beam is connected thereto at an angle so as to depend substantially vertically from said strut in the height direction.

19. The store load and ejector device of claim 13 in which leading and trailing edges of said upper (strut) portions and said lower (beam) portions of the load supporting members are slanted in the vertical direction.

20. An improved store load and ejector device for aircraft comprising:
   a. a substantially horizontal cap plate having at least three fastening points providing for stabilizing the device laterally and longitudinally when secured to an aircraft;
   b. a pair of longitudinally extending load supporting members integrally joined to and depending from opposite side margins of the cap plate for supporting a load of stores to be suspended from said device;
   c. said cap plate being substantially shorter longitudinally than said load supporting members;
   d. said load supporting members each comprising
      an upper portion forming a strut integrally joined to a side margin of said cap plate and a lower portion forming a store-supporting beam joined at its upper edge to the lower edge of said strut and extending longitudinally substantially beyond said upper portion and said cap plate;
  e. leading and trailing edges of said struts and beams being inclined in the vertical direction; and
  f. at least one store ejector rack carried only by each of said lower portion store-supporting beams for attachment and release of stores to be carried thereby.

21. The store load and ejector device of claim 20 in which at least one of said struts forms substantially a trapezoid having a shorter upper edge and a longer lower edge said upper edge positioned approximately midway of said longer lower edge.

22. The store load and ejector device of claim 20 in which the upper portion of said load supporting member is canted laterally to form an angle with respect to the lower portion thereof and to said cap plate.

23. The store load and ejector device of claim 20 in which said beam is approximately twice the length of said strut.

* * * * *